United States Patent [19]
Burke

[11] 3,843,196
[45] Oct. 22, 1974

[54] AUTO ARM REST
[76] Inventor: Albert C. Burke, 933 W. Collins Ave., Orange, Calif. 92667
[22] Filed: Sept. 8, 1972
[21] Appl. No.: 287,584

[52] U.S. Cl. ............................................. 297/417
[51] Int. Cl. ........................... A47c 7/54, B60n 1/06
[58] Field of Search ............ 297/417, 35, 113, 115, 297/412, 413, 414–422; 5/52

[56] References Cited
UNITED STATES PATENTS

| | | | |
|---|---|---|---|
| 293,384 | 2/1884 | Wakefield | 297/417 X |
| 1,252,192 | 1/1918 | Stanford | 297/416 |
| 1,420,924 | 6/1922 | Hogan | 297/417 X |
| 1,802,620 | 4/1931 | Scully | 297/417 |
| 2,085,836 | 7/1937 | Tatum | 297/417 |
| 2,338,814 | 1/1944 | Jones | 297/417 |
| 2,592,702 | 4/1952 | Sprung | 297/417 |
| 3,168,346 | 2/1965 | Rei | 297/417 |

*Primary Examiner*—Paul R. Gilliam

[57] ABSTRACT

An arm rest to be arranged between laterally spaced front seat units of a commerical van-type vehicle and mounted on the floor. The arm rest has a normally horizontally elongate padded arm engaging rest part normally spaced above the top planes of the seat units and forward of the back rests of the seat units and an articulated substantially rectangular frame carrying said rest. The frame comprises a plurality of hingedly connected sections and is adapted to be manually folded from a normal to a collapsed position whereby the arm rest part occurs wholly below the plane of the tops of the seat units.

4 Claims, 3 Drawing Figures

PATENTED OCT 22 1974
3,843,196
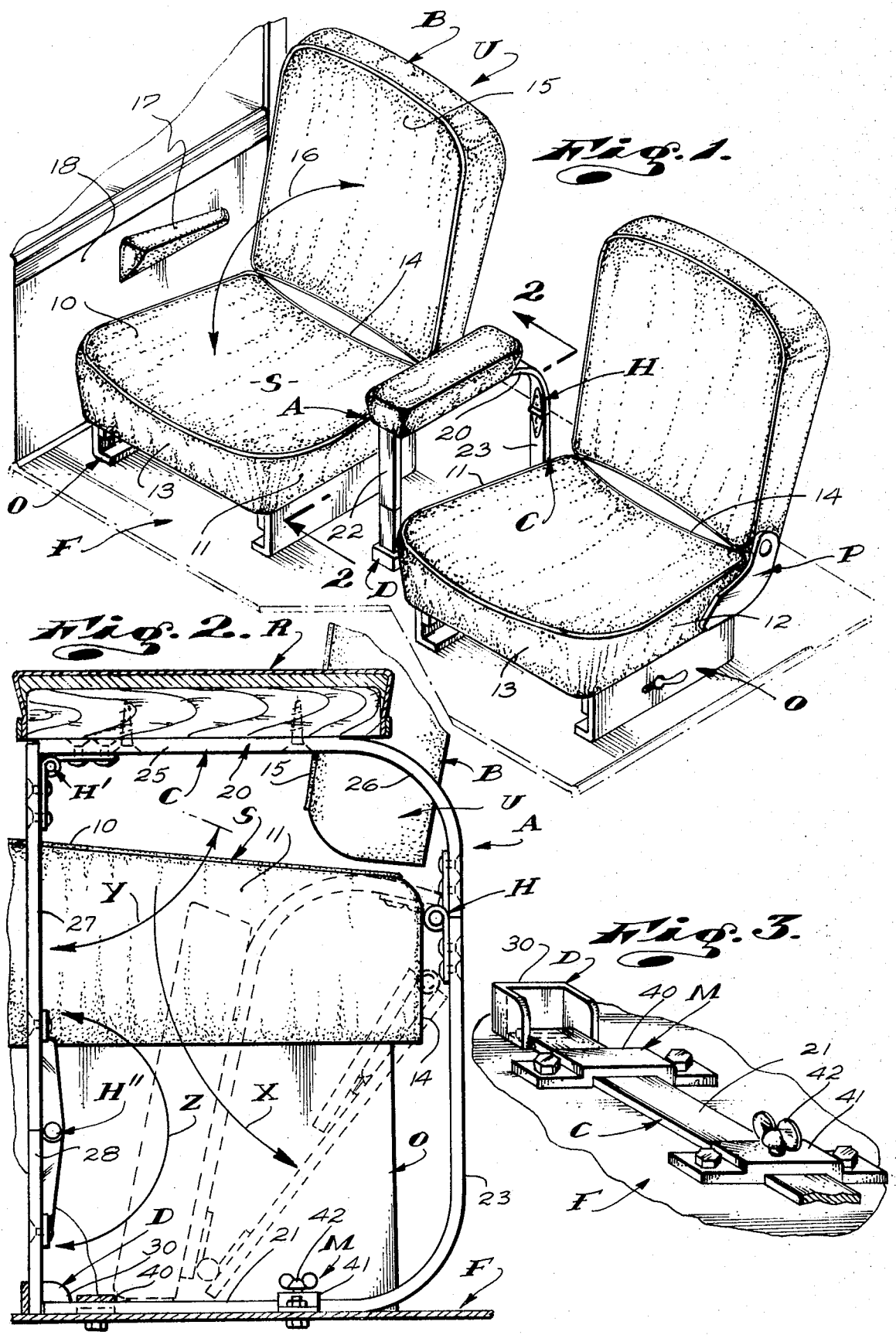

AUTO ARM REST

This invention has to do with a novel arm rest structure and is more particularly concerned with a collapsible arm rest arranged between the laterally spaced front seats of a vehicle, such as a van-type truck.

The ordinary van-type truck or similar commercial vehicle is characterized by a front driver's compartment in which a pair of laterally spaced forwardly disposed unitary seats are arranged, one for the driver of the truck and the other for a passenger. The seats are simple upholstered units with top or supporting surfaces. The surfaces are normally forwardly and upwardly inclined and are spaced approximately 20" above the level of the floor of the truck on which the seat units are engaged and supported. The seat units are further characterized by back rests which normally project upwardly from the rear sides or edges of the seats and which have upwardly and rearwardly inclined front support surfaces. The lower portions of the back rests are pivoted at the rear of the seats so that the back rests can be pivoted forwardly and downwardly, to occur horizontally above the tops of their related seats and so that free access to the interior of the vehicle or van, rearward of the driver's compartment and seats, can be established.

The seat units referred to above are secured to the floor of the vehicle with which they are related by mounting means which are such that the seats can be shifted or adjusted forwardly and rearwardly relative to the dash-board and vehicle controls within the driver's compartment.

In addition to the above and related to the seats, it is common practice to provide outer arm rests adjacent the lateral outwardly disposed sides of the seats and upon which the driver and passenger can conveniently rest their related laterally outwardly disposed or outer arms. The outer arm rests are commonly secured to the inside panels of side access doors to the driver's compartment.

The foregoing is the basic, conventional seat arrangement and structure provided in the majority of commercial vehicles, such as van-type trucks.

For the purpose of this disclosure and to avoid prolixity, I will, in the following, refer to the vehicle with which my invention is related as a van-type truck, or more simply, a van.

In a van there is no central arm rest or rests between or at the inner sides of the seats and upon which the driver and passenger can rest and support their laterally inwardly disposed or inner arms. The failure or refusal to provide inner arm rests in vans is due to the fact that free access laterally of the driver's compartment and across and between the seats must be provided for the satisfactory and convenient use and operation of the vehicle and the presence or existence of an arm rest, which must be and occurs above the tops of the seats and forward of the fronts of the back rests of the seats, would create an obstruction and prevent free lateral access and movement across and between the seats. It is considered that the lateral access afforded by the absence of a central arm rest between the seats is more important than the comfort and physical aid afforded by an arm rest.

The prior art has recognized that the provision of a central arm rest between two adjacent seats can be provided and that free lateral access across and between the seats can be afforded by the provision of a collapsible central arm rest; that is, by the provision of a central arm rest that can be folded or collapsed and moved out of the way when lateral access across and between the seats is desired or required.

To the above end, a considerable number of collapsible central arm rests for arrangement between adjacent seats have been provided by the prior art, but such structures have proven to be wanting and/or inappropriate or unsuitable for use in connection or combination with the front seats of vans and the like.

Those few collapsible or foldable central arm rest structures provided by the prior art, which are such that they might be arranged between the seats of a van have been costly and complicated structures and/or are such that when they ar folded down or collapsed, they do not in fact move out of the way and afford the necessary or desired access.

An object and feature of the present invention is to provide a novel and improved collapsible central arm rest for arrangement with and between the front seats of a van which is such that it can be easily, quickly and conveniently shifted from a normal, up or in use position where it occurs above the tops of the seats and the fronts of the back rests for the seats, to a collapsed or down position where it is moved to a position below and rearward of the tops and backs of the seats and back rests.

It is another object and feature of my invention to provide an arm rest structure of the character referred to which is extremely simple and inexpensive to manufacture and install, which is easy and convenient to operate or use and which is rugged and durable.

The foregoing and other objects and features of my invention will be apparent and understood from the following detailed description of a typical preferred form and application of my invention throughout which description reference is made to the accompanying drawings in which:

FIG. 1 is an isometric view showing my new collapsible arm rest arranged between the front seats of a van in its normal, up position;

FIG. 2 is an enlarged detailed sectional view taken substantially as indicated by line 2—2 on FIG. 1 and showing the structure in collapsed position in phantom lines;

FIG. 3 is an isometric view of a portion of my new structure and showing a preferred form of mounting means therefor.

Referring first to FIG. 1 of the drawings, I have shown a pair of likely laterally spaced seat units U with upholstered seats S with forwardly and upwardly inclined supporting surfaces or tops 10 laterally spaced opposed inner sides 11, outer sides 12, front sides 13 and rear sides 14.

The seats are suitably mounted and secured to the floor F of a related van by mounting means O, which means preferably affords for forward and rearward shifting and adjustment of the seats.

Since the means O can vary widely in form and construction without departing from the spirit of the invention, I will not unduly burden this disclosure with further and detailed description of the means O.

Each unit U further includes a back rest B projecting upwardly from the back side 14 of the seat S and having a rearwardly and upwardly inclined, forwardly disposed back supporting front 15.

The back rests B are pivotally secured to their related seats S by hinge means such as is indicated at P and so that the back rests B can be pivoted forwardly and downwardly in the direction indicated by the arrow 16 in FIG. 1 of the drawings, where the back rests occur substantially horizontally above and adjacent the tops 10 of their related seats.

I have shown an arm rest 17 on the inside panel of related door 18 at or adjacent the outer side 12 of one of the seats to indicate the general nature and form of arm rest structure provided by the prior art.

The tops 10 of the seats S are, in accordance with conventional proportioning and dimensions, approximately 20" above the level of the floor F. The inner sides 11 of the seats are commonly spaced from 12 to 18 inches part.

The seat structures and the relationship of the seats relative to each other and to the parts and portions of the van related thereto, as shown in the drawings and described above, is intended to illustrate, generally, that basic structure provided by the prior art and the environment in and with which my new arm rest is related.

The arm rest A that I provide includes a vertical sectional, substantially rectangular, frame C with horizontal, forwardly and rearwardly extending upper and lower rails 20 and 21 and vertical front and rear legs 22 and 23. The lower rail 21 engages and rests on the floor between the seat units U.

The rear leg 23 is integrally joined with the rear end of the rail 21 and is of limited vertical extent, that is, the leg 23 is substantially equal and preferably slightly less than the distance between the floor F and the tops 10 of the seats.

The front leg 22 is greater in vertical extent than the rear leg and is such that it normally projects a sufficient distance above the tops 10 of the seats S whereby an arm rest R carried by the frame C occurs a proper distance above the tops of the seats. For example, the leg 22 can be approximately 26" high, 6" higher than the leg 21 and so that it normally terminates approximately 6" above the plane of the tops 10 of the seats.

The top rail 20 has a straight, substantially horizontal forward portion 25 projecting rearwardly from the top of the front leg 22 and a downwardly extending rear portion 26 converging with the top of the rear leg 23. The rear portion 26 is preferably a rearwardly and downwardly curved or radiused portion.

The legs 22 and 23 are, for example, spaced approximately 16" apart and the rear portion 26 of the rail 20 extends about 6" or 6½" vertically and longitudinally or horizontally.

The top end of the leg 23 and rear downwardly disposed end of the rail 20 normally establishes stopped butted engagement with each other and are pivotally or hingedly coupled by a first hinge means H.

The hinge means H is a simple strap hinge arranged adjacent the interior side of the frame with its straps fixed to the adjacent end portion of the leg 23 and beam 20 by screw fasteners, rivets, or the like. The hinge means H permits or allows the top rail and the arm rest R to swing or pivot downwardly and rearwardly relative to the leg 23 in the direction indicated by the arrow X in FIG. 2 of the drawings and to that position shown in phantom lines.

The front end of the top rail 20 is normally in butted stopped engagement against the upper rear side of the front leg 22 and is pivotally connected with the front leg by a secondary hinge means H' which permits the leg 22 to be swung or pivoted rearwardly and upwardly relative to the rail 20 in the direction indicated by the arrow Y and to a position, relative to the rail 20 substantially as indicated in phantom lines in FIG. 2.

The hinge means H' is the same or similar to the hinge means H and is related and fixed to its related parts and/or portion of the frame C in the same manner as the hinge means H.

The leg 22 is sufficiently long so that it could not be pivoted through the arc of arrow X to that position shown in phantom lines if it were not made in sections and such that its longitudinal extent can be shortened or lessened.

Accordingly, the leg 22 is sectional, having an upper section 27 and a lower section 28. The sections 27 and 28 are normally in aligned, butted, end to end and stopped engagement with each other and are hingedly connected one to the other by a third hinge means H'', which means allows or permits the section 28 to be selectively pivoted rearwardly and upwardly relative to the section 27 as indicated by the arrow Z and to that position, relative to the section 27, indicated in phantom lines.

The hinge means H'' is a two position, spring loaded hinge structure, such as a drop-leaf hinge and is yieldingly, shiftable from a normal, stopped, aligned or open position, as shown in solid lines in FIG. 2, 180° to a free, folded or closed position, as shown in phantom lines in FIG. 2.

The hinge H'' is arranged at the inner side of the frame and its strap portions are screw fastened or riveted to its adjacent portion of the leg section 27 and 28.

Since the spring lock hinge structure of the hinge means H'' can vary widely in construction and is a standard piece of hardware, well known in the art, further detailed disclosure and description thereof can be dispensed with.

The lower end of the leg 22, that is the free end of the section 28 of the leg 22, is normally engaged and releasably retained is an upwardly opening cup or receiver means D at the forward end of the bottom rail 21. The receiver or receiver means D establishes an upwardly opening socket or recess at the front edge of the rail 27 in which the lower end of the leg 22 is releasably engaged and held against horizontal shifting or movement. In the case illustrated the receiver is established by a horizontal U-shaped part 30 with a base portion spaced forward of and extending laterally of the front end of the rail 21 and having laterally spaced rearwardly projecting leg portions fixed to the opposite sides of the front portion of the rail 21, as by welding. The floor F serves to establish the bottom and the part 30 and front end of the rail 21 serve to establish the sides of the upwardly opening receiver socket of the means D.

The means D, together with the hinge means H'' normally holds the frame in its normal, up position.

When it is desired to fold or collapse the frame to its down position, as shown in phantom lines in FIG. 2, the lower end of the leg is manually lifted and urged out of engagement in the receiver D, the lower section 28 is pivoted as indicated by arrow Z and the assembly of leg 27 is then pivoted relative to the rail 20 as indicated by the arrow Y. At the same time or subsequent to the movement indicated by the arrow Y, the top rail 20 and rest R, with the assembly of leg 22 is pivoted down as indicated by the arrow X and the construction is in its collapsed or down position.

The structure is shifted from its down to its up position by simply reversing the above procedure.

The arm rest R is a simple elongate padded or upholstered block like unit fixed to the top of the front portion 25 of the upper rail 20. The rest R can, as shown, include a wood block fixed to the rail 20 by screw fasteners and covered with suitable padding and upholstery material.

The rest can be of any desired lateral extent and, preferably, normally, overlies the upper end of the leg 22. It has a rear end that terminates forward of the vertical plane of rear legs 23, substantially as illustrated.

The rest R is preferably about 2" or 3" in vertical extent and such that its top supporting surface is normally approximately 7" or 8" above the plane of the seat top 10, or that distance above said seat tops which is most suitable or satisfactory for an arm rest.

Finally, the structure here provided includes mounting means M for securing the lower rail 21 to the floor F of the van, between the seat units U. The means M can vary widely in form and is preferably such that it allows or permits the structure A to be moved or adjusted forwardly and rearwardly between and relative to the seat units as desired or as circumstances require.

In the drawings, I have shown one suitable form of adjustable mounting means M, which means includes front and rear laterally extending, elongate mounting bars 40 and 41 with central guide portions extending about the top and sides of the rail 21 and tabs or end portions at the opposite sides of the rail and screw fastened to the floor F. The rear mounting bar is provided with a vertical set screw 42, in the form of a manually operable wing bolt engaged through the central guide portion of that bar to engage the rail 21 and hold it against longitudinally shifting in and relative to the bars.

With the means M described above, it will be apparent that the frame is securely held on and relative to the floor and that it can, when desired, be adjusted or shifted fore and aft as desired.

It is to be noted that the primary or first hinge means is spaced rearward of the front 15 of the back rests B and below the tops 10 of the seats S of the seat units U and rearward of and below the rear end of the arm rest R whereby the rear end of the rest R, when in it normal position, above the plane of the seat tops 10 extends at least to and preferably rearward of the plane of the fronts 15 of the backs B whereby an adequate and usable arm rest is presented; and, whereby the rear portion 26 of the top rail 20 and the rest R, more particularly the rear end of the rest R occurs entirely below the plane of the seat tops 10 when the structure is in its folded down or collapsed position, as shown in phantom lines in FIG. 2 of the drawings.

In light of the above, it will be apparent that the noted placement of the pivotal axis between the rear hinge and top rail, established by the first hinge means H is most important and is that special arrangement which enables the rail 20 and rest R to be pivoted down and below the plane of the seat tops and in such a manner that free lateral access across and between the seat units is attained.

Further, the noted placement of the first hinge means H and relative proportioning of the legs of the frame required that the legs 22 be sectional, as disclosed, to enable the structure to be effectively folded, as shown.

Attempts to make the front leg short and provide an upwardly projecting post at the forward end of the rail 21 and carrying the receiver D proved less satisfactory than the structure shown as it was difficult to engage the leg 22 in the receiver and the post like structure established an extremely undesirable obstruction.

The various sections of the frame C can be established of any suitable metal stock and are preferably established of strap stock. In the physical embodiment of my invention, ½" × 1½" aluminum bar stock has proved to be structurally sound and most aesthetically pleasing.

Having described but one preferred form and carrying out of my invention, I do not wish to be limited to the specific details herein set forth, but wish to reserve to myself any modifications and/or variations that may appear to those skilled in the art to which this invention pertains.

Having described my invention, I claim:

1. A unitary, collapsible arm rest attachment for engagement on the floor of a vehicle between laterally spaced opposing inner sides of a pair of separate and independent forwardly disposed armless seat units secured to said floor and each including a seat with a top surface spaced above the floor and a back rest with a front surfaced projecting upwardly from the rear side of said top surface, said arm rest including a sectional, normally substantially rectangular frame arranged substantially rectangular frame arranged substantially parallel with and in spaced relationship between said inner sides of the seat units and including a lower, horizontal forwardly and rearwardly extending lower floor engaging rail, a vertical rear leg joined integrally with and projecting upwardly from the rear end of the lower rail, an elongate upper rail with a normally horizontal front portion and a downwardly and rearwardly extending rear portion, first hinge means connecting the rear end of the upper rail to the upper end of the rear leg, a normally vertical front leg comprising upper and lower sections, second hinge means connecting the upper end of the upper section to the front end of the upper rail, third hinge means connecting the lower and upper ends of the upper and lower sections together, a receiver at the forward end of the lower rail normally receiving and releasably holding the lower end of lower section, an elongate arm rest secured to the top of the front portion of the upper rail and having a top rest surface normally spaced above the planes of the tops of the seats and extend forwardly from between the back rests and mounting means releasably securing the lower rail to the floor, the axis of the first hinge means is spaced downwardly and rearwardly from the arm rest and from the planes of the top and front surfaces of the seat units, the vertical extent of the frame is greater than its fore and aft longitudinal extent of the frame and the longitudinal extent of the sections of the front leg are less than the longitudinal extent of the frame.

2. A structure as set forth in claim 1 wherein the receiver defines an upwardly opening socket in which the lower end of said lower section is normally removably seated.

3. A structure as set forth in claim 1 wherein said mounting means includes parts spaced longitudinally of and slidably engaging the lower rail, means securing said parts to the floor and screw actuated locking means carried by at least one of said parts and operable to lock the lower rail against movement relative to said parts.

4. A structure as set forth in claim 3 wherein the receiver defines an upwardly opening socket in which the lower end of said lower section is normally removably seated.

* * * * *